United States Patent
Lin

(10) Patent No.: US 11,956,767 B2
(45) Date of Patent: Apr. 9, 2024

(54) APPARATUS AND METHOD FOR SCHEDULING RESOURCE ALLOCATION OF SAME

(71) Applicant: GUANGDONG OPPO MOBILE TELECOMMUNICATIONS CORP., LTD., Dongguan (CN)

(72) Inventor: Huei-Ming Lin, Victoria (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 365 days.

(21) Appl. No.: 17/206,017

(22) Filed: Mar. 18, 2021

(65) Prior Publication Data

US 2021/0212081 A1    Jul. 8, 2021

Related U.S. Application Data

(63) Continuation of application No. PCT/CN2019/099864, filed on Aug. 8, 2019.

(60) Provisional application No. 62/739,513, filed on Oct. 1, 2018.

(51) Int. Cl.
*H04W 72/12* (2023.01)
*H04W 4/40* (2018.01)
*H04W 72/044* (2023.01)

(52) U.S. Cl.
CPC ......... *H04W 72/12* (2013.01); *H04W 72/044* (2013.01); *H04W 4/40* (2018.02)

(58) Field of Classification Search
CPC ................................ H04W 72/12; H04W 4/40

USPC ......................................................... 370/330
See application file for complete search history.

(56) References Cited

U.S. PATENT DOCUMENTS

2019/0387377 A1* 12/2019 Zhang ................. H04W 52/383

FOREIGN PATENT DOCUMENTS

| CN | 108347772 A | 7/2018 |
|----|-------------|--------|
| WO | WO2017135881 A1 | 8/2017 |
| WO | WO2018004323 A1 | 1/2018 |
| WO | WO2020069649 A1 | 4/2020 |

OTHER PUBLICATIONS

Guangdong OPPO Mobile Telecommunications Corp., Ltd., International Search Report and Written Opinion, PCT/CN2019/099864, dated Nov. 4, 2019, 6 pgs.

(Continued)

*Primary Examiner* — Angel T Brockman
(74) *Attorney, Agent, or Firm* — Morgan, Lewis & Bockius LLP

(57) ABSTRACT

An apparatus and a method for scheduling resource allocation of the same are provided. The method includes deciding on a resource allocation for a second user equipment according to resource related information associated with the second user equipment and/or status information associated with the second user equipment. The resource related information includes at least one of bandwidth part related information, carrier information, transmit (TX) and/or receive (RX) pool information, radio access technology (RAT) information, timing domain information of sidelink resources, and frequency domain information of the sidelink resources.

16 Claims, 3 Drawing Sheets

(56) References Cited

OTHER PUBLICATIONS

Lenovo, Mechanisms for V2V resource allocation, 3GPP TSG RAN WGI Meeting #84, R1-161014, St Julian's Malta, Feb. 15-19, 2016, 7 pgs.
Guangdong OPPO Mobile Telecommunications Corp., Ltd., Extended European Search Report, EP19869321.0, dated Nov. 9, 2021, 10 pgs.
NTT DOCOMO, Inc., Sidelink resource allocation mechanism, 3GPP TSG RAN WG1 Meeting #94bis, R1-1811335, Chengdu, China, Oct. 8-12, 2018, 10 pgs.
Xiaomi Communications, On resource allocation of V2x communications, 3GPP TSG RAN WGI Meeting #94bis, R1-1811422, Chengdu, China, Oct. 9-12, 2018, 3 pgs.
Guangdong OPPO Mobile Telecommunications Corp., Ltd., First Office Action, EP19869321.0, dated Nov. 7, 2023, 8 pgs.
Further Discussion on Resource Allocation Issues and Way Forward for Release 13, R2-154269, 3GPP TSG-RAN WG2 #91bis, Malmö, Sweden, Oct. 5-10, 2015, 4 pgs.

* cited by examiner

APPARATUS AND METHOD FOR SCHEDULING RESOURCE ALLOCATION OF SAME

CROSS-REFERENCE TO RELATED APPLICATION

The present application is a continuation of International Application No. PCT/CN2019/099864, filed on Aug. 8, 2019, which claims benefit of U.S. Application No. 62/739,513, filed on Oct. 1, 2018, both of which are hereby incorporated herein by reference in their entirety.

FIELD OF DISCLOSURE

The present disclosure relates to the field of communication systems, and more particularly, to an apparatus and a method for scheduling resource allocation of the same.

DESCRIPTION OF RELATED ART

The development of wireless technologies for direct vehicle-to-vehicle (V2V) or vehicle-to-everything (V2X) communication as part of intelligent transportation system (ITS) is gradually evolving from broadcasting basic safety transmissions like periodic vehicle status and warning messages to supporting more advanced use cases and services like extended sensor data sharing, autonomous driving, and vehicle platooning.

Under long term evolution-V2X (LTE-V2X) communication technologies are developed by 3rd generation partnership project (3GPP) in release 14 and release 15. In release-16, V2X communication technologies are further developed in new radio (NR) architectures, i.e., NR-V2X.

SUMMARY

In a first aspect of the present disclosure, a first user equipment for scheduling resource allocation includes a memory, a transceiver, and a processor coupled to the memory and the transceiver. The processor is configured to decide on a resource allocation for a second user equipment according to resource related information associated with the second user equipment and/or status information associated with the second user equipment.

In a second aspect of the present disclosure, a method for scheduling resource allocation of a first user equipment includes deciding on a resource allocation for a second user equipment according to resource related information associated with the second user equipment and/or status information associated with the second user equipment.

In a third aspect of the present disclosure, a second user equipment for scheduling resource allocation includes a memory, a transceiver, and a processor coupled to the memory and the transceiver. The processor is configured to decide on a resource allocation for the second user equipment according to resource related information associated with the second user equipment and/or status information associated with the second user equipment.

In a fourth aspect of the present disclosure, a method for scheduling resource allocation of a second user equipment includes deciding on a resource allocation for the second user equipment according to resource related information associated with the second user equipment and/or status information associated with the second user equipment.

In a fifth aspect of the present disclosure, a first network node for scheduling resource allocation includes a memory, a transceiver, and a processor coupled to the memory and the transceiver. The processor is configured to decide on a resource allocation for a second user equipment according to resource related information associated with the second user equipment and/or status information associated with the second user equipment.

In a sixth aspect of the present disclosure, a method for scheduling resource allocation of a first network node includes deciding on a resource allocation for a second user equipment according to resource related information associated with the second user equipment and/or status information associated with the second user equipment.

In a seventh aspect of the present disclosure, a second network node for scheduling resource allocation includes a memory, a transceiver, and a processor coupled to the memory and the transceiver. The processor is configured to decide on a resource allocation for a second user equipment according to resource related information associated with the second user equipment and/or status information associated with the second user equipment.

In an eighth aspect of the present disclosure, a method for scheduling resource allocation of a second network node includes deciding on a resource allocation for a second user equipment according to resource related information associated with the second user equipment and/or status information associated with the second user equipment.

In a ninth aspect of the present disclosure, a non-transitory machine-readable storage medium has stored thereon instructions that, when executed by a computer, cause the computer to perform the above method.

In a tenth aspect of the present disclosure, a terminal device includes a processor and a memory configured to store a computer program. The processor is configured to execute the computer program stored in the memory to perform the above method.

In an eleventh aspect of the present disclosure, a base station includes a processor and a memory configured to store a computer program. The processor is configured to execute the computer program stored in the memory to perform the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In some embodiments, in release 16, some new features are being discussed, e.g., for new radio vehicle-to-everything (NR-V2X), e.g., to allow one user equipment (UE) to schedule a resource allocation of another UE. The problem is how to handle a relationship between the two UEs and network nodes, considering that each UE may rely on its serving network node to get sidelink (SL) grant, i.e., there are two scheduling UEs and two serving network nodes. Some embodiments are to solve how to implement UE-UE scheduling considering an independent status of the two scheduling UEs including a sync status, a resource allocation mode, a coverage status, a buffer status, a transmit (Tx) Pool status, and/or a receive (Rx) pool status.

Figure 1:
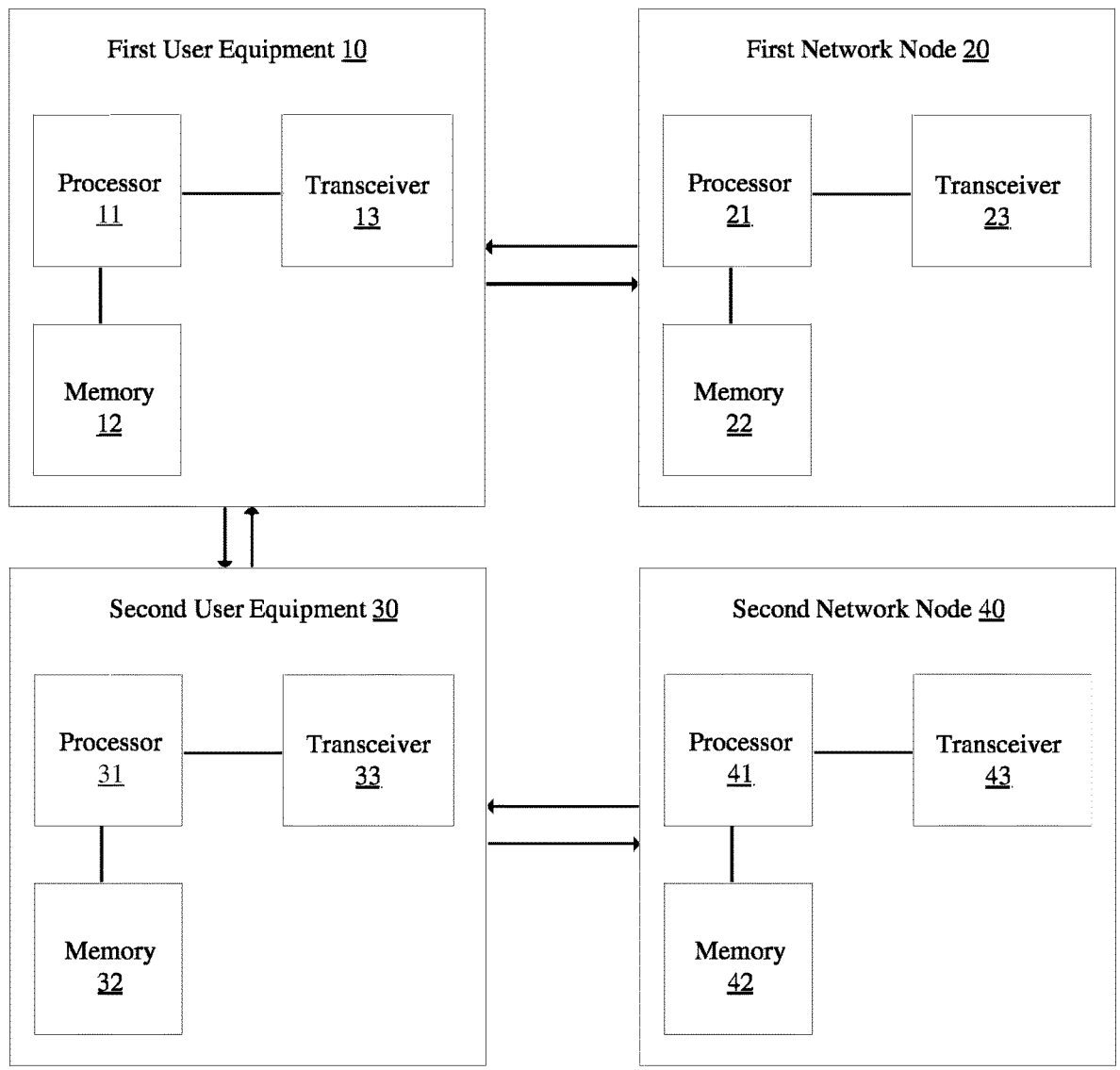
FIG. 1 is a block diagram of a first user equipment, a second user equipment, a first network node, and a second network node for scheduling resource allocation according to an embodiment of the present disclosure.

FIG. 1 illustrates that, in some embodiments, a first user equipment (UE) 10, a second user equipment 30, a first network node 20, and a second network node 40 for scheduling resource allocation according to an embodiment of the present disclosure are provided. The first UE 10 may include a processor 11, a memory 12, and a transceiver 13. The second UE 30 may include a processor 31, a memory 32, and a transceiver 33. The first network node 20 may include a processor 21, a memory 22, and a transceiver 23. The second network node 40 may include a processor 41, a memory 42, and a transceiver 43. The processor 11, 21, 31, or 41 may be configured to implement proposed functions, procedures and/or methods described in this description. Layers of radio interface protocol may be implemented in the processor 11, 21, 31, or 41. The memory 12, 22, 32, or 42 is operatively coupled with the processor 11, 21, 31, or 41 and stores a variety of information to operate the processor 11, 21, 31, or 41. The transceiver 13, 23, 33, or 43 is operatively coupled with the processor 11, 21, 31, or 41, and the transceiver 13, 23, 33, or 43 transmits and/or receives a radio signal.

The processor 11, 21, 31, or 41 may include an application-specific integrated circuit (ASIC), other chipsets, logic circuit and/or data processing devices. The memory 12, 22, 32, or 42 may include a read-only memory (ROM), a random access memory (RAM), a flash memory, a memory card, a storage medium and/or other storage devices. The transceiver 13, 23, 33, or 43 may include baseband circuitry to process radio frequency signals. When the embodiments are implemented in software, the techniques described herein can be implemented with modules (e.g., procedures, functions, and so on) that perform the functions described herein. The modules can be stored in the memory 12, 22, 32, or 42 and executed by the processor 11, 21, 31, or 41. The memory 12, 22, 32, or 42 can be implemented within the processor 11, 21, 31, or 41 or external to the processor 11, 21, 31, or 41, in which those can be communicatively coupled to the processor 11, 21, 31, or 41 via various means are known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) release 14, 15, 16, and beyond. UEs communicate with each other directly via a sidelink interface such as a PC5 interface.

FIG. 1 illustrates that, in some embodiments, the processor 11 is configured to decide on a resource allocation for the second user equipment 30 according to resource related information associated with the second user equipment 30 and/or status information associated with the second user equipment 30.

In some embodiments, the transceiver 13 is configured to transmit, to the second user equipment 30, a first indication, and the first indication is to indicate the resource related information to be used by the second user equipment 30 for sidelink communication. In some embodiments, before the transceiver 13 transmits, to the second user equipment 30, the first indication, the transceiver 13 further receives a sixth indication from the first network node 20, and the sixth indication is used for the processor 11 to derive the resource related information. In some embodiments, before the transceiver 13 transmits, to the second user equipment 30, the first indication, the transceiver 13 further receives the sixth indication from the first network node 20, and the sixth indication is to indicate the resource related information to be used by the second user equipment 30 for the sidelink communication.

In some embodiments, the transceiver 13 is configured to receive the sixth indication from the first network node 20, and the sixth indication is to indicate the resource related information to be used by the second user equipment 30 for sidelink communication. In some embodiments, after the transceiver 13 receives the sixth indication from the first network node 30, the transceiver 13 further transmits, to the second user equipment 30, a first indication, and the first indication is to indicate the resource related information to be used by the second user equipment 30 for the sidelink communication. In some embodiments, the resource related information includes at least one of bandwidth part related information, carrier information, transmit (TX) and/or receive (RX) pool information, radio access technology (RAT) information, timing domain information of sidelink resources, and frequency domain information of the sidelink resources.

In some embodiments, the transceiver 13 is configured to receive a third indication from the second user equipment 30, and the third indication is to indicate the status information of the second user equipment 30. In some embodiments, after the transceiver 13 receives the third indication from the second user equipment 30, the transceiver 13 further transmits, to the first network node 20, a fifth indication, and the fifth indication is to indicate the status information of the second user equipment 30.

In some embodiments, the transceiver 13 is configured to transmit, to the first network node 20, a fifth indication, and the fifth indication is to indicate the status information of the second user equipment 30. In some embodiments, before the transceiver 13 transmits, to the first network node 20, the fifth indication, the transceiver 13 further receives, a third indication from the second user equipment 30, and the third indication is to indicate the status information of the second user equipment 30. In some embodiments, the status information includes at least one of synchronization related information, coverage related information, buffer related information, Tx pool related information, Rx pool related information, and resource allocation mode related information.

FIG. 1 illustrates that, in some embodiments, the processor 31 is configured to decide on a resource allocation for the second user equipment 30 according to resource related information associated with the second user equipment 30 and/or status information associated with the second user equipment 30.

In some embodiments, the transceiver 33 is configured to receive a first indication from the first user equipment 10, and the first indication is to indicate the resource related information to be used by the second user equipment 30 for sidelink communication. In some embodiments, after the transceiver 33 receives the first indication from the first user equipment 10, the transceiver 33 further transmits, to the second network node 40, a seventh indication, and the seventh indication is to indicate the resource related information to be used by the second user equipment 30 for the sidelink communication. In details, the first indication is used for the processor 31 to derive the seventh indication.

In some embodiments, after the transceiver 33 transmits, to the second network node 40, the seventh indication, the transceiver 33 further receives a sidelink grant from the second network node 40 according to the resource related information indicated by the seventh indication. In some embodiments, after the transceiver 33 receives the first indication, the processor 31 further selects resource for sidelink communication between the first user equipment 10 and the second user equipment 30. In some embodiments, the selection is according to the resource related information based on a synchronization reference of the second user equipment 30. In some embodiments, the selection is according to the resource related information based on a transmission resource pool of the second user equipment 30. In some embodiments, the resource related information includes at least one of bandwidth part related information, carrier information, transmit (TX) and/or receive (RX) pool information, radio access technology (RAT) information, timing domain information of sidelink resources, and frequency domain information of the sidelink resources.

In some embodiments, the transceiver 33 is configured to transmit, to the first user equipment 10, a third indication, and the third indication is to indicate the status information of the second user equipment 30. In some embodiments, before the transceiver 33 transmits, to the first user equipment 10, the third indication, the transceiver 33 further receives a fourth indication from the second network node 40, and the fourth indication is to indicate the status information of the second user equipment 30.

In some embodiments, the transceiver 33 is configured to receive a fourth indication from the second network node 40, and the fourth indication is to indicate the status information of the second user equipment 30. In some embodiments, after the transceiver 33 receives the fourth indication from the second network node 40, the transceiver 33 further transmits, to the first user equipment 10, the third indication, and the third indication is to indicate the status information of the second user equipment 30. In some embodiments, the status information includes synchronization related information, coverage related information, buffer related information, Tx pool related information, Rx pool related information, and/or resource allocation mode related information.

FIG. 1 illustrates that, in some embodiments, the processor 21 is configured to decide on a resource allocation for the second user equipment 30 according to resource related information associated with the second user equipment 30 and/or status information associated with the second user equipment 30.

In some embodiments, the transceiver 23 is configured to transmit, to the first user equipment 10, a sixth indication, and the sixth indication is used for the second user equipment 30 to derive the resource related information. In some embodiments, the transceiver 23 is configured to transmit, to the first user equipment 10, the sixth indication, and the sixth indication is to indicate the resource related information to be used by the second user equipment 30 for sidelink communication between the first user equipment 10 and the second user equipment 30. In some embodiments, the resource related information includes at least one of bandwidth part related information, carrier information, transmit (TX) and/or receive (RX) pool information, radio access technology (RAT) information, timing domain information of sidelink resources, and frequency domain information of the sidelink resources.

In some embodiments, the transceiver 21 is configured to receive a fifth indication from the first user equipment 10, and the fifth indication is to indicate the status information of the second user equipment 30. In some embodiments, the status information includes synchronization related information, coverage related information, buffer related information, Tx pool related information, Rx pool related information, and/or resource allocation mode related information.

FIG. 1 illustrates that, in some embodiments, the processor 41 is configured to decide on a resource allocation for the second user equipment 30 according to resource related information associated with the second user equipment 30 and/or status information associated with the second user equipment 30.

In some embodiments, the transceiver 43 is configured to receive a seventh indication from the second user equipment 30, and the seventh indication is to indicate the resource related information to be used by the second user equipment 30 for the sidelink communication. In some embodiments, after the transceiver 43 receives the seventh indication from the second user equipment 30, the processor 41 further assigns, to the second user equipment 30, a sidelink grant according to the resource related information indicated by the seventh indication. In some embodiments, the resource related information includes at least one of bandwidth part related information, carrier information, transmit (TX) and/or receive (RX) pool information, radio access technology (RAT) information, timing domain information of sidelink resources, and frequency domain information of the sidelink resources.

In some embodiments, the transceiver 43 is configured to transmit, to the second user equipment 30, a fourth indication, and the fourth indication is to indicate the status information of the second user equipment 30. In some embodiments, the status information includes synchronization related information, coverage related information, buffer related information, Tx pool related information, Rx pool related information, and/or resource allocation mode related information.

Figure 2:
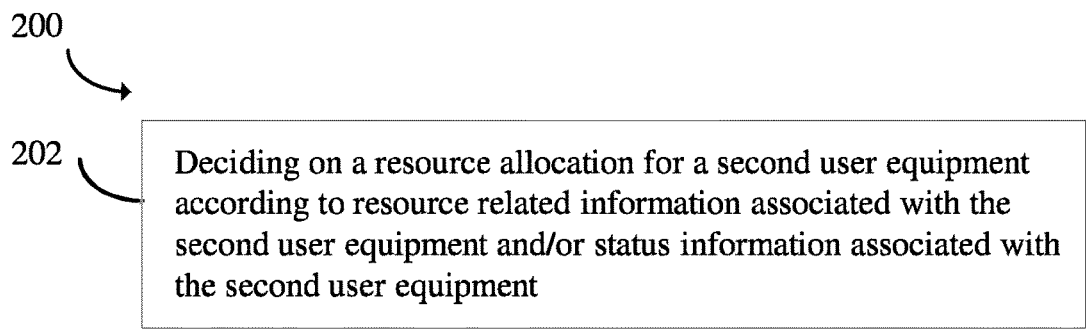
FIG. 2 is a flowchart illustrating a method for scheduling resource allocation of a first user equipment according to an embodiment of the present disclosure.

FIG. 2 illustrates a method 200 for scheduling resource allocation of a first user equipment according to an embodiment of the present disclosure. In some embodiments, the method 200 includes: a block 202, deciding on a resource allocation for a second user equipment according to resource related information associated with the second user equipment and/or status information associated with the second user equipment.

In some embodiments, the method further includes transmitting, to the second user equipment, a first indication, and the first indication is to indicate the resource related information to be used by the second user equipment for sidelink communication. In some embodiments, before transmitting, to the second user equipment, the first indication, the method further includes receiving a sixth indication from a first network node, and the sixth indication is used for the first user equipment to derive the resource related information. In some embodiments, before transmitting, to the second user equipment, the first indication, the method further includes receiving a sixth indication from a first network node, and the sixth indication is to indicate the resource related information to be used by the second user equipment for the sidelink communication.

In some embodiments, the method further includes receiving a sixth indication from a first network node, and the sixth indication is to indicate the resource related information to be used by the second user equipment for sidelink communication. In some embodiments, after receiving the sixth indication from the first network node, the method further includes transmitting, to the second user equipment, a first indication, and the first indication is to indicate the resource related information to be used by the second user equipment for the sidelink communication. In some embodiments, the resource related information includes at least one of bandwidth part related information, carrier information, transmit (TX) and/or receive (RX) pool information, radio access technology (RAT) information, timing domain information of sidelink resources, and frequency domain information of the sidelink resources.

In some embodiments, the method further includes receiving a third indication from the second user equipment, and the third indication is to indicate the status information of the second user equipment. In some embodiments, after receiving the third indication from the second user equipment, the method further includes transmitting, to a first network node, a fifth indication, and the fifth indication is to indicate the status information of the second user equipment.

In some embodiments, the method further includes transmitting, to a first network node, a fifth indication, and the fifth indication is to indicate the status information of the second user equipment. In some embodiments, before transmitting, to the first network node, the fifth indication, the method further includes receiving, a third indication from the second user equipment, and the third indication is to indicate the status information of the second user equipment. In some embodiments, the status information includes synchronization related information, coverage related information, buffer related information, Tx pool related information, Rx pool related information, and/or resource allocation mode related information.

Figure 3:
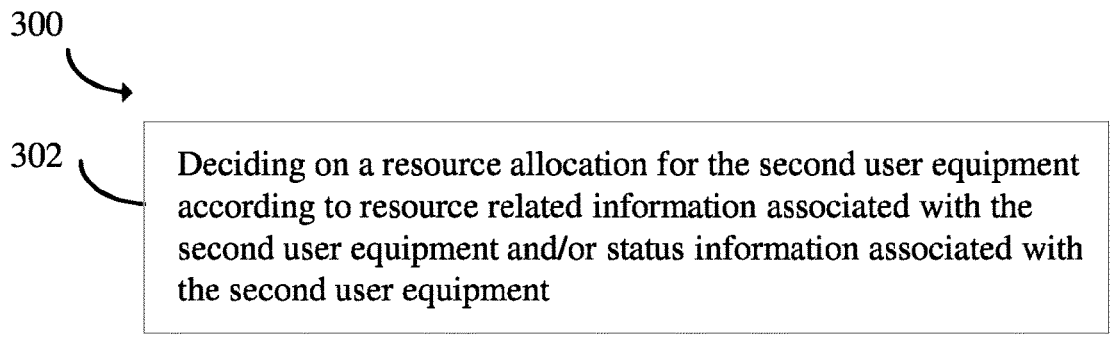
FIG. 3 is a flowchart illustrating a method for scheduling resource allocation of a second user equipment according to an embodiment of the present disclosure.

FIG. 3 illustrates a method 300 for scheduling resource allocation of a second user equipment according to an embodiment of the present disclosure. In some embodiments, the method 300 includes: a block 302, deciding on a resource allocation for the second user equipment according to resource related information associated with the second user equipment and/or status information associated with the second user equipment.

In some embodiments, the method further includes receiving a first indication from a first user equipment, and the first indication is to indicate the resource related information to be used by the second user equipment for sidelink communication. In some embodiments, after receiving the first indication from the first user equipment, the method further includes transmitting, to a second network node, a seventh indication, and the seventh indication is to indicate the resource related information to be used by the second user equipment for the sidelink communication. In details, the first indication is used for the second user equipment to derive the seventh indication.

In some embodiments, after transmitting, to the second network node, the seventh indication, the method further includes receiving a sidelink grant from the second network node according to the resource related information indicated by the seventh indication. In some embodiments, after receiving the first indication, the method further includes selecting resource for sidelink communication between the first user equipment and the second user equipment. In some embodiments, the selection is according to the resource related information based on a synchronization reference of the second user equipment. In some embodiments, the selection is according to the resource related information based on a transmission resource pool of the second user equipment. In some embodiments, the resource related information includes at least one of bandwidth part related information, carrier information, transmit (TX) and/or receive (RX) pool information, radio access technology (RAT) information, timing domain information of sidelink resources, and frequency domain information of the sidelink resources.

In some embodiments, the method further includes transmitting, to a first user equipment, a third indication, and the third indication is to indicate the status information of the second user equipment. In some embodiments, before transmitting, to the first user equipment, the third indication, the method further includes receiving a fourth indication from a second network node, and the fourth indication is to indicate the status information of the second user equipment.

In some embodiments, the method further includes receiving a fourth indication from a second network node, and the fourth indication is to indicate the status information of the second user equipment. In some embodiments, after receiving the fourth indication from the second network node, the method further includes transmitting, to a first user equipment, the third indication, and the third indication is to indicate the status information of the second user equipment. In some embodiments, the status information includes synchronization related information, coverage related information, buffer related information, Tx pool related information, Rx pool related information, and/or resource allocation mode related information.

Figure 4:
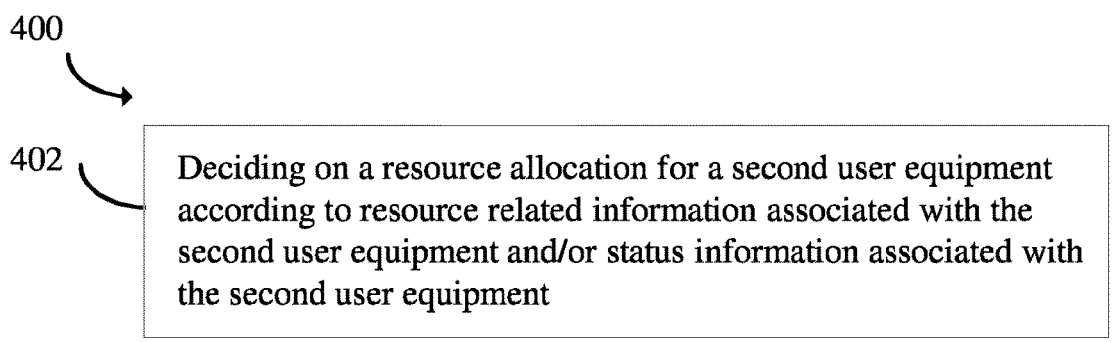
FIG. 4 is a flowchart illustrating a method for scheduling resource allocation of a first network node according to an embodiment of the present disclosure.

FIG. 4 illustrates a method 400 for scheduling resource allocation of a first network node according to an embodiment of the present disclosure. In some embodiments, the method 400 includes: a block 402, deciding on a resource allocation for a second user equipment according to resource related information associated with the second user equipment and/or status information associated with the second user equipment.

In some embodiments, the method further includes transmitting, to a first user equipment, a sixth indication, and the sixth indication is used for the second user equipment to derive the resource related information. In some embodiments, the method further includes transmitting, to a first user equipment, a sixth indication, and the sixth indication is to indicate the resource related information to be used by the second user equipment for sidelink communication between the first user equipment and the second user equipment. In some embodiments, the resource related information includes at least one of bandwidth part related information, carrier information, transmit (TX) and/or receive (RX) pool information, radio access technology (RAT) information, timing domain information of sidelink resources, and frequency domain information of the sidelink resources.

In some embodiments, the method further includes receiving a fifth indication from a first user equipment, and the fifth indication is to indicate the status information of the second user equipment. In some embodiments, the status information includes synchronization related information, coverage related information, buffer related information, Tx pool related information, Rx pool related information, and/or resource allocation mode related information.

Figure 5:
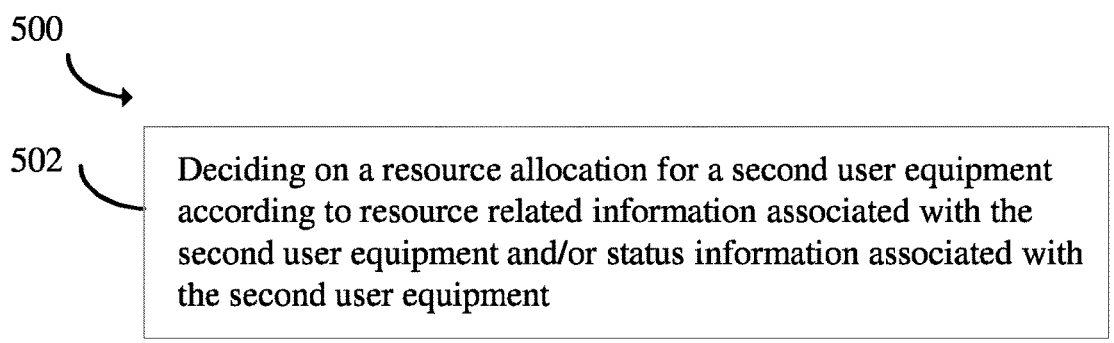
FIG. 5 is a flowchart illustrating a method for scheduling resource allocation of a second network node according to an embodiment of the present disclosure.

FIG. 5 illustrates a method 500 for scheduling resource allocation of a second network node according to an embodiment of the present disclosure. In some embodiments, the method 500 includes: a block 502, deciding on a resource allocation for a second user equipment according to resource related information associated with the second user equipment and/or status information associated with the second user equipment.

In some embodiments, the method further includes receiving a seventh indication from the second user equipment, and the seventh indication is to indicate the resource related information to be used by the second user equipment for the sidelink communication. In some embodiments, after receiving the seventh indication from the second user equipment, the method further includes assigning, to the second user equipment, a sidelink grant according to the resource related information indicated by the seventh indication. In some embodiments, the resource related information includes at least one of bandwidth part related information, carrier information, transmit (TX) and/or receive (RX) pool information, radio access technology (RAT) information, timing domain information of sidelink resources, and frequency domain information of the sidelink resources.

In some embodiments, the method further includes transmitting, to the second user equipment, a fourth indication, and the fourth indication is to indicate the status information of the second user equipment. In some embodiments, the status information includes synchronization related information, coverage related information, buffer related information, Tx pool related information, Rx pool related information, and/or resource allocation mode related information.

Figure 6:
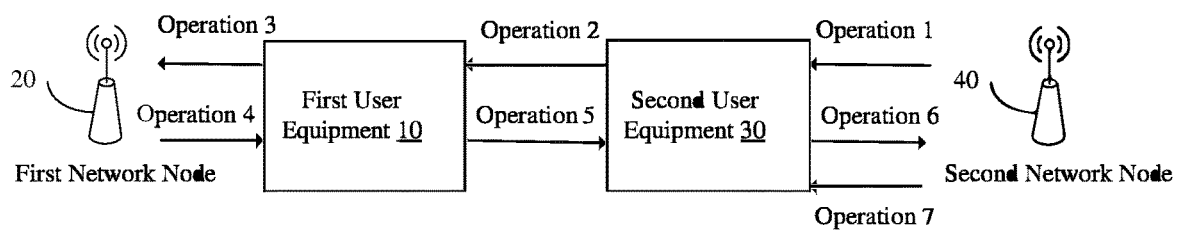
FIG. 6 is a schematic diagram of an exemplary illustration of a first user equipment, a second user equipment, a first network node, and a second network node for scheduling resource allocation according to an embodiment of the present disclosure.

FIG. 6 illustrates an exemplary illustration of the first user equipment 10, the second user equipment 30, the first network node 20, and the second network node 40 for scheduling resource allocation according to an embodiment of the present disclosure.

In some embodiments, both the first user equipment 10 and the second user equipment 30 are in coverage and in a radio resource control (RRC) connected state. The embodiment includes operations 1 to 7.

At the operation 1, the second user equipment 30 receives a fourth indication from the second network node 40, where the fourth indication is to indicate the second user equipment 30 with status information, and the status information includes at least one of the followings. 1. Synchronization related information, e.g., synchronization priority setting, synchronization configuration, and etc. 2. Coverage related information, e.g., public land mobile network (PLMN), RAT, frequency carrier, and etc. 3. Tx pool related information and/or Rx pool related information, e.g., TX and/or RX pool configuration for sidelink communication. 4. Resource allocation mode related information, e.g., mode 1 and/or mode 2 of the second user equipment 30.

In details, mode 1 is a scheduled resource allocation. In this case, a user equipment (UE) needs to be RRC connected in order to transmit data. The UE requests transmission resources from a network node such as a base station. The network node schedules transmission resources for transmission of sidelink control and data. Mode 2 is an autonomous resource selection. In this case, the UE on its own selects resources from resource pools to transmit sidelink control and data.

At the operation 2, the second user equipment 30 transmits a third indication to the first user equipment 10, where the third indication includes status information of the second user equipment 30. The status information includes at least one of the followings. 1. Synchronization related information, e.g., synchronization priority setting, synchronization configuration, and etc. 2. Coverage related information, e.g., PLMN, RAT, frequency carrier whether the second user equipment 30 is in coverage or not, and etc. 3. Buffer status information, e.g., whether this is buffered data in the second user equipment 30, and which service, provider service identifier (PSID), destination, and/or logical channel the buffered data belongs to. 4. Tx pool related information and/or Rx pool related information, e.g., TX and/or RX pool configuration for sidelink communication. 5. Resource allocation mode related information, e.g., mode 1 and/or mode 2 of the second user equipment 30.

At the operation 3, the first user equipment 10 transmits a fifth indication to the first network node 20, where the fifth indication includes status information of the second user equipment 30. The status information includes at least one of the followings. 1. Synchronization related information, e.g., synchronization priority setting, synchronization configuration, and etc. 2. Coverage related information, e.g., PLMN, RAT, frequency carrier whether the second user equipment 30 is in coverage or not, and etc. 3. Buffer status information, e.g., whether this is buffered data in the second user equipment 30, and which service, provider service identifier (PSID), destination, and/or logical channel the buffered data belongs to. 4. Tx pool related information and/or Rx pool related information, e.g., TX and/or RX pool configuration for sidelink communication. 5. Resource allocation mode related information, e.g., mode 1 and/or mode 2 of the second user equipment 30.

At the operation 4, the first network node 20 decides on a resource allocation for the second user equipment 30 and transmits a sixth indication to the first user equipment 10, where the sixth indication is to indicate sidelink resource related information for the second user equipment 30. The sidelink resource related information includes at least one of the followings. 1. BWP, i.e., bandwidth part related information. 2. Carrier information. 3. TX and/or RX pool information. 4. RAT information, i.e., LTE PC5 and/or NR PC5. 5. Timing domain information of sidelink resources, i.e., in time domain, which resources are allocated. 6. Frequency domain information of sidelink resources, i.e., in frequency domain, which resources are allocated.

At the operation 5, the first user equipment 10 based on the sixth indication at the operation 4, decide the resource allocation for the second user equipment 30, and transmits a first indication to the second user equipment 30, where the first indication is to indicate sidelink resource related information for the second user equipment 30. The sidelink resource related information includes at least one of the followings. 1. BWP, i.e., bandwidth part related information. 2. Carrier information. 3. TX and/or RX pool information. 4. RAT information, i.e., LTE PC5 and/or NR PC5. 5. Timing domain information of sidelink resources, i.e., in time domain, which resources are allocated. 6. Frequency domain information of sidelink resources, i.e., in frequency domain, which resources are allocated.

At the operation 5, the first user equipment 10 can simply use the sixth indication to generate the first indication, or it can further decide on the first indication by a media access control (MAC) entity of its own within the resource indicated in the sixth indication, i.e., considering the status information of other UEs which communicates with the first user equipment 10 and/or the second user equipment 30, and can also take into account of characteristic of sidelink resource, e.g., channel busy ratio (CBR) measurement and/or sensing measurement result.

At the operation 6, the second user equipment 30 reports the resource indicated in the first indication to the second network node 40 as follows. The second user equipment 30 based on the first indication in the operation 4, transmits a seventh indication to the second network node 40, where the seventh indication is to indicate sidelink resource related information for the second user equipment 30. The sidelink resource related information includes at least one of the followings. 1. BWP, i.e., bandwidth part related information. 2. Carrier information. 3. TX and/or RX pool information. 4. RAT information, i.e., LTE PC5 and/or NR PC5. 5. Timing domain information of sidelink resources, i.e., in time domain, which resources are allocated. 6. Frequency domain information of sidelink resources, i.e., in frequency domain, which resources are allocated.

At the operation 7, the second network node 40 further decides on the resource allocation for the second user equipment 30 and indicates a resource grant to the second user equipment 30.

In some embodiments, both the first user equipment 10 and the second user equipment 30 are in coverage and in a radio resource control (RRC) connected state. In this embodiment, in operations 1 to 7, operations 1 to 3 can be removed, such that there is no status report from the second user equipment 30 to the first user equipment 10 or the first network node 20.

In some embodiments, both the first user equipment 10 and the second user equipment 30 are in coverage and in a radio resource control (RRC) connected state. In this embodiment, in operations 1 to 7, operations 6 and 7 can be removed, such that there is no further resource allocation by the second network node 40. The second user equipment 30 can simply use the resource indicated in the first indication or can further decide on the first indication by the MAC entity of its own within the resource indicated in the first indication, i.e., considering status information of other UEs which communicates with the first user equipment 10 and/or the second user equipment 30, and can also take into account of characteristic of sidelink resource, e.g., CBR measurement and/or sensing measurement result.

In some embodiments, the first user equipment 10 is in coverage and in RRC connected state, the second user equipment 30 is out of coverage or in RRC idle state. In this embodiment, in operations 1 to 7, the operation 1 is optional, operations 6 and 7 are removed.

In some embodiments, the second user equipment 30 is in coverage and in RRC connected state, the first user equipment 10 is out of coverage or in RRC idle state. In this embodiment, in operations 1 to 7, the operations 3 and 4 are removed.

In some embodiments, both the first user equipment 10 and the second user equipment 30 are out of coverage or in RRC idle state. In this embodiment, in operations 1 to 7, the operation 1 is optional, and the operations 3, 4, 6, and 7 are removed.

Figure 7:
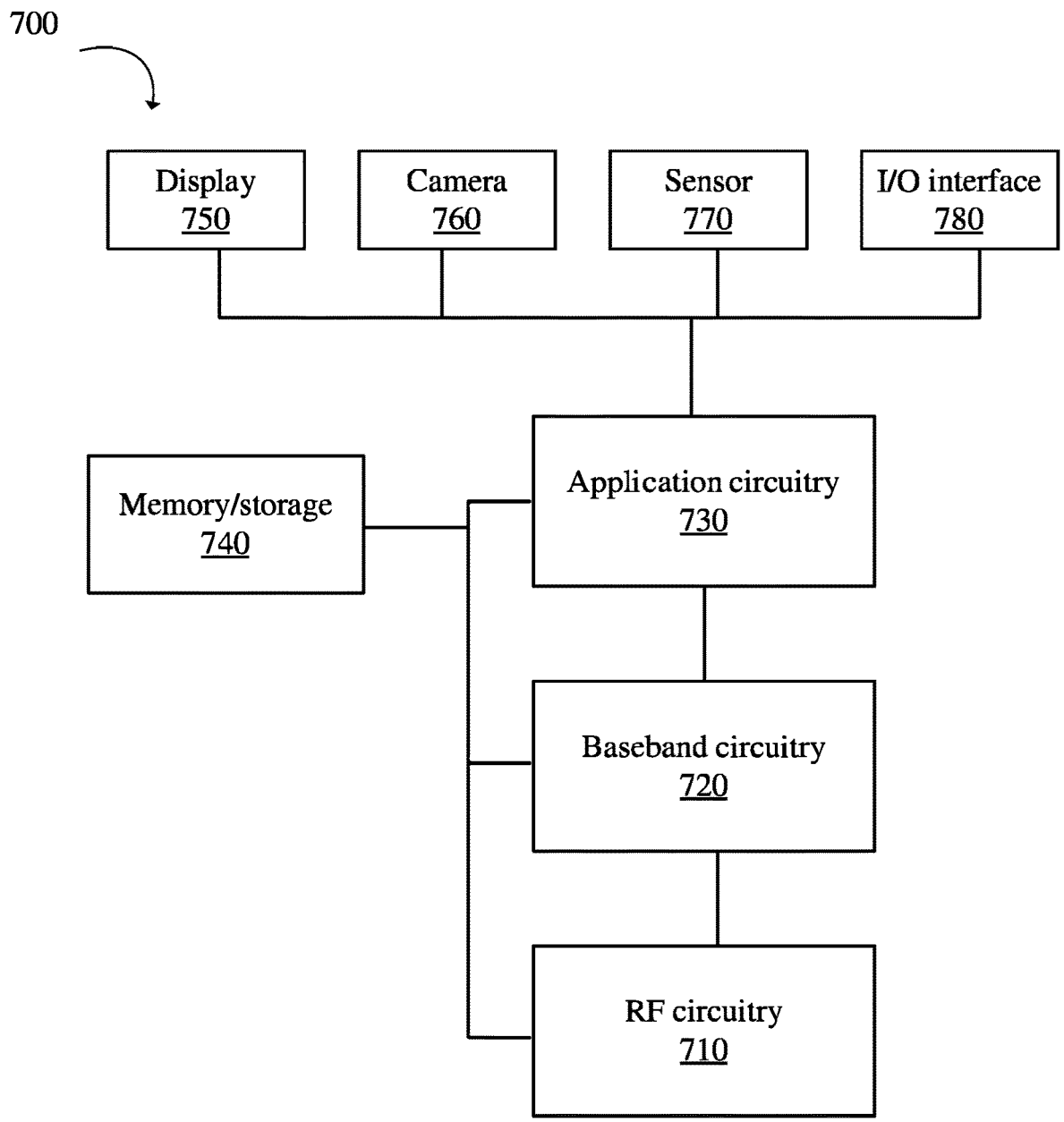
FIG. 7 is a block diagram of a system for wireless communication according to an embodiment of the present disclosure.

FIG. 7 is a block diagram of an example system 700 for wireless communication according to an embodiment of the present disclosure. Embodiments described herein may be implemented into the system using any suitably configured hardware and/or software. FIG. 7 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an application specific integrated circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

Some embodiments of the present disclosure provide an apparatus and a method for scheduling resource allocation of the same capable of performing UE-UE scheduling in vehicle-to-everything (V2X) communication and improving reliability. The embodiment of the present disclosure is a combination of techniques/processes that can be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A first user equipment for scheduling resource allocation, comprising:
   a memory;
   a transceiver; and
   a processor coupled to the memory and the transceiver;
   wherein the processor is configured to decide on a resource allocation for a second user equipment according to status information associated with the second user equipment, and the transceiver is configured to receive a third indication from the second user equipment, and the third indication is to indicate the status information of the second user equipment, and after the transceiver receives the third indication from the second user equipment, the transceiver further transmits, to a first network node, a fifth indication, and the fifth indication is to indicate the status information of the second user equipment.

2. The first user equipment of claim 1, wherein the resource allocation for the second user equipment is further decided according to resource related information associated with the second user equipment, and the transceiver is configured to transmit, to the second user equipment, a first indication, and the first indication is to indicate the resource related information to be used by the second user equipment for sidelink communication.

3. The first user equipment of claim 2, wherein before the transceiver transmits, to the second user equipment, the first indication, the transceiver further receives a sixth indication from the first network node, and the sixth indication is used for the processor to derive the resource related information.

4. The first user equipment of claim 2, wherein before the transceiver transmits, to the second user equipment, the first indication, the transceiver further receives a sixth indication from the first network node, and the sixth indication is to indicate the resource related information to be used by the second user equipment for the sidelink communication.

5. The first user equipment of claim 1, wherein the resource allocation for the second user equipment is further decided according to resource related information associated with the second user equipment, and wherein the transceiver is configured to receive a sixth indication from the first network node, and the sixth indication is to indicate the resource related information to be used by the second user equipment for sidelink communication.

6. The first user equipment of claim 5, wherein after the transceiver receives the sixth indication from the first network node, the transceiver further transmits, to the second user equipment, a first indication, and the first indication is to indicate the resource related information to be used by the second user equipment for the sidelink communication.

7. The first user equipment of claim 1, wherein the resource related information comprises at least one of bandwidth part related information, carrier information, transmit (TX) and/or receive (RX) pool information, radio access technology (RAT) information, timing domain information of sidelink resources, and frequency domain information of the sidelink resources.

8. The first user equipment of claim 1, wherein the third indication is received from the second user equipment before transmitting the fifth indication.

9. The first user equipment of claim 1, wherein the status information comprises at least one of synchronization related information, coverage related information, buffer related information, Tx pool related information, Rx pool related information, and resource allocation mode related information.

10. A method for scheduling resource allocation of a first user equipment, comprising:
deciding on a resource allocation for a second user equipment according to status information associated with the second user equipment,
wherein the method further comprises:
receiving a third indication from the second user equipment, and the third indication is to indicate the status information of the second user equipment, and
after receiving the third indication from the second user equipment, transmitting to a first network node, a fifth indication, and the fifth indication is to indicate the status information of the second user equipment.

11. The method of claim 10, wherein the resource allocation for the second user equipment is further decided according to resource related information associated with the second user equipment, and the method further comprises: transmitting, to the second user equipment, a first indication, and the first indication is to indicate the resource related information to be used by the second user equipment for sidelink communication.

12. The method of claim 11, before transmitting, to the second user equipment, the first indication, the method further comprising receiving a sixth indication from the first network node, and the sixth indication is used for the first user equipment to derive the resource related information.

13. The method of claim 11, wherein before transmitting, to the second user equipment, the first indication, the method further comprising receiving a sixth indication from the first network node, and the sixth indication is to indicate the resource related information to be used by the second user equipment for the sidelink communication.

14. The method of claim 10, wherein the resource allocation for the second user equipment is further decided according to resource related information associated with the second user equipment, and the method further comprises: receiving a sixth indication from the first network node, and the sixth indication is to indicate the resource related information to be used by the second user equipment for sidelink communication.

15. The method of claim 14, wherein after receiving the sixth indication from the first network node, the method further comprising transmitting, to the second user equipment, a first indication, and the first indication is to indicate the resource related information to be used by the second user equipment for the sidelink communication.

16. A non-transitory machine-readable storage medium having stored thereon instructions that, when executed by a computer, cause the computer to perform steps of the method of claim 10.

* * * * *